United States Patent [19]
Lehr et al.

[11] Patent Number: 4,778,208
[45] Date of Patent: Oct. 18, 1988

[54] YIELDING ARRANGEMENT OF A BUMPER AT THE BODY OF A MOTOR VEHICLE

[75] Inventors: Werner Lehr, Germering; Wolfgang Anzenhofer, Olching; Horst Spirk, Munich; Hartmut Bonenberger, Puchheim, all of Fed. Rep. of Germany

[73] Assignee: Bayerische Motoren Werke Aktiengesellschaft, Munich, Fed. Rep. of Germany

[21] Appl. No.: 51,693

[22] Filed: May 20, 1987

[30] Foreign Application Priority Data

May 21, 1986 [DE] Fed. Rep. of Germany ....... 3617099

[51] Int. Cl.$^4$ .................. B60R 19/34; B60R 19/36
[52] U.S. Cl. .................. 293/133; 293/102; 296/189; 188/371
[58] Field of Search ............... 293/102, 107, 132, 133, 293/134; 296/189; 188/371; 280/784

[56] References Cited

U.S. PATENT DOCUMENTS

| 3,146,014 | 8/1964 | Kroell | 293/133 |
| 3,298,465 | 1/1967 | Stastny | 293/133 |
| 3,511,345 | 5/1970 | Takamatsu et al. | 293/133 X |
| 3,697,108 | 10/1972 | Diener | 293/133 |
| 3,822,907 | 7/1974 | Appel et al. | 280/784 X |
| 3,887,223 | 6/1975 | Bez | 188/371 X |
| 4,061,386 | 12/1927 | Chupick | 293/134 |

FOREIGN PATENT DOCUMENTS

| 2213323 | 9/1972 | Fed. Rep. of Germany . |
| 2441557 | 3/1976 | Fed. Rep. of Germany . |
| 2022764 | 12/1979 | United Kingdom | 188/371 |

Primary Examiner—Robert B. Reeves
Assistant Examiner—Russell D. Stormer
Attorney, Agent, or Firm—Barnes & Thornburg

[57] ABSTRACT

A yielding arrangement of a bumper at the body of a motor vehicle in which the bumper is connected with a longitudinal bearer by way of impact shock absorbers under interposition of a deformation member. For purposes of obtaining a high energy absorption with a comparatively large deformation displacement, the deformation member is essentially formed by several roll sheet metal members which extend substantially parallel to the impact shock absorber along the inner walls of a housing secured at the longitudinal bearer. The roll members are connected at their ends opposite the bumper with the housing and at their other ends are secured at the impact shock absorber.

16 Claims, 2 Drawing Sheets

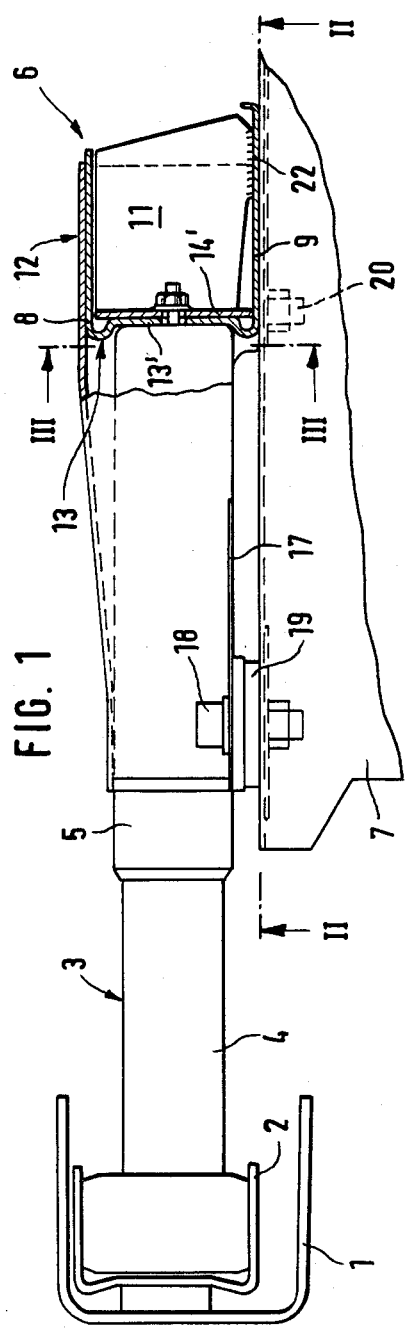
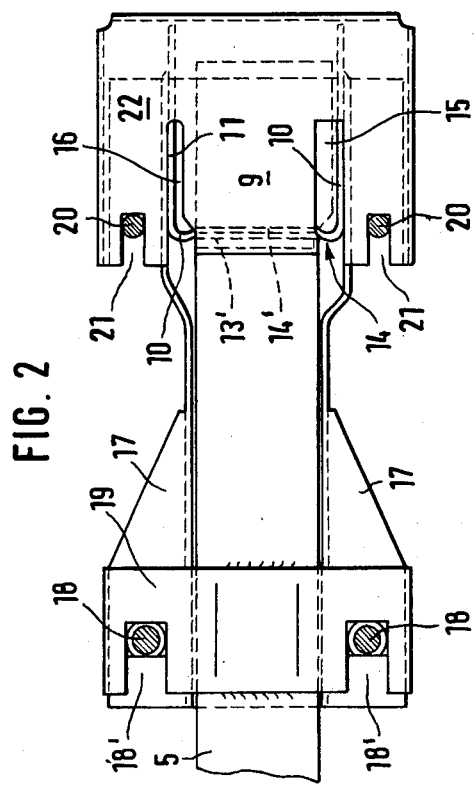
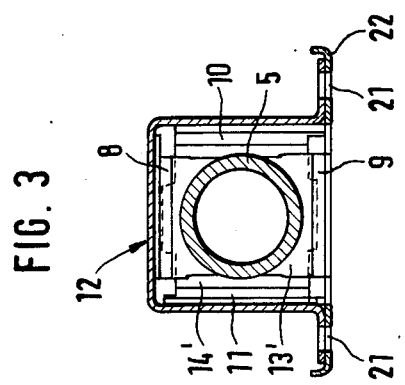

YIELDING ARRANGEMENT OF A BUMPER AT THE BODY OF A MOTOR VEHICLE

BACKGROUND AND SUMMARY OF THE INVENTION

The present invention relates to a yielding arrangement of a bumper at the body of a motor vehicle with impact-absorbing shock absorbers extending approximately in the driving direction, of which each is connected at one end with a bumper and is supported at the other end against an energy-dissipating deformation member arranged at the body.

Impact-absorbing shock absorbers are so designed in such arrangements—in some countries by reason of laws—that they absorb the entire impact energy up to an impact velocity of 8 km/h and then automatically regenerate themselves again. A large proportion of all frontal impact accidents, however, takes place at slightly higher impact velocities between 12 and 15 km/h. If the impact-absorbing shock absorbers are connected essentially rigidly with the body of the motor vehicle, such as with the longitudinal bearers thereof, greater damages occur at the body structures of the motor vehicles at the just-mentioned impact velocities. The repair expenditure can then be quite considerable.

In order to counteract this, it is already known (DE-OS No. 24 41 557) to support impact-absorbing shock absorbers at the longitudinal bearers of a motor vehicle by way of energy-dissipating elements. The impact-absorbing shock absorber protrudes for that purpose with one end into the interior space of the longitudinal bearer and is arranged with this end at a deformation member having a so-called honeycomb structure. The honeycomb structure can be compressed to a length of about 20% of the original length. It therefore requires more installation space than is available as deformation path in case of a load.

The present invention is concerned with the task to indicate an arrangement of a bumper at the body of a motor vehicle of the aforementioned type which also with constricted space conditions assures a comparatively large deformation path in the deformation member with as uniform as possible a deformation force and therefore with a high energy-absorption capacity.

The underlying problems are solved according to the present invention in an arrangement of a bumper at the body of a motor vehicle in that the deformation includes several roll sheet metal members which extend substantially parallel to the impact-absorbing shock absorber along the inner wall of a housing secured at the body and are connected at their ends opposite the bumper with the housing whereas the other ends are secured at the impact shock absorber. A roll sheet metal member is a relatively simple structural element. By its arrangement in the housing, an essentially constant bending radius in the roll area of the sheet metal member is assured in case of a displacement of the impact shock absorber within the same housing. As a result thereof, the deformation resistance is essentially the same over the entire deformation path and a far-reachingly rectangular force-displacement-diagram is obtained. With such a force curve, a high energy absorption capacity can be attained with a predetermined maximum force. If the end of the impact shock absorber which is connected with the roll sheet member is displaced up to the other end of the roll sheet member (in the original condition), then the roll sheet member has rolled off only up to the center thereof, from which follows that the utilizable deformation path is about twice as long as the leg length of the roll sheet member.

In a particularly preferred embodiment of the present invention, the housing is detachably connected with a longitudinal bearer of the body. In this manner, a damage of the front end structure, respectively, of the longitudinal bearer can be still avoided completely, for example, with impact velocities of about 8 to 12 km/h, whereby in the case of repairs, only the housing then has to be replaced by a new housing with not-yet deformed roll sheet members.

At somewhat higher impact velocities, the longitudinal bearer will also be deformed already in the forward area thereof; however, a large portion of the impact eergy has been absorbed beforehand by the impact shock absorber and the deformation member constructed according to the present invention so that it will be frequently possible to repair the engine bearer with a so-called cut-off repair, in which only a Part of the bearer—appropriately beginning with a suitable separating place—has to be replaced.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein:

FIG. 1 is a side elevational view, partly in cross section, of the shock absorber arrangement in accordance with the present invention;

FIG. 2 is an elevational view, taken in the direction of the arrows II—II of FIG. 1;

FIG. 3 is a cross-sectional view taken along line III—III of FIG. 1, and

DETAILED DESCRIPTION OF THE DRAWINGS

Figure 4A:
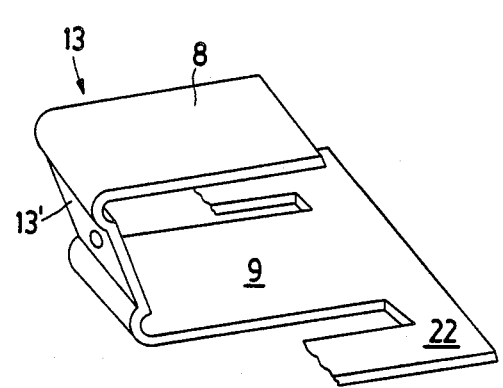
FIGS. 4A and B show the U-shaped sheet metal members in a separated disassembled manner.
Figure 4B:
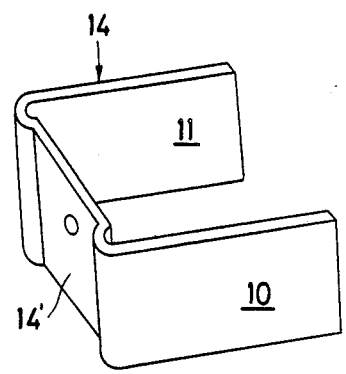

Referring now to the drawing wherein like reference numerals are used throughout the various views to designate like parts, the bumper 1 illustrated in cross section in FIG. 1 of the drawing is connected by way of two appropriate mounting members 2 with a respective impact shock absorber generally designated by reference numeral 3 which extends in the driving direction and which regenerates itself again after a preceding load. In the illustrated embodiment, the forward displacement rod 4 is connected with the mounting member 2 whereas the cylinder 5 is supported at its rear end opposite the bumper 1, at a deformation member generally designated by reference numeral 6 which is arranged at a longitudinal bearer 7 of the vehicle body.

The deformation member 6 includes several roll sheet members 8, 9, 10 and 11, which extend parallel to the shock absorber along the inner walls of a housing 12 secured at the longitudinal bearer 7. The roll sheet members 8–11 are connected at their ends opposite the bumper 1 with the housing 12 whereas their other ends are secured at the rear area of the cylinder 5 of the impact shock absorber 3. The fastening and construction of the roll sheet metal members can take place, as can be seen in particular from FIG. 1, in such a manner that two roll sheet metal members 8, 9, and 10, 11, respectively are formed each by the legs of a U-shaped crimped sheet metal member 13 and 14, respectively. The legs of each member being separated by web 13', and 14', which webs are connected with the end area of the cylinder 5 of the impact shock absorber 3. In the preferred embodiment, two crimped metal members 13 and 14 are provided whose webs 13' and 14' cross one another at right angle. A threaded bolt which projects from the rear end of the cylinder 5 for the fastening of the two webs 13' and 14' at the shock absorber 3, extends through the two webs 13' and 14'; a fastening nut is screwed over the threaded bolt.

As can be seen in particular from FIG. 2, the roll sheet metal member 9 is formed by a wall section of the housing 12 which is separated from the remainder lower wall of this housing by lateral longitudinal slots 15 and 16.

The housing 12 is detachably connected with the longitudinal bearer 7. It receives not only the deformation member 6 but also the cylinder 5 of the impact shock absorber 3. The housing 12 is open in the downward direction in its forward section and surrounds the cylinder 5 within this area with a relatively small spacing. At its forward end, lateral fastening lugs 17 are provided at the housing 12 in order to be able to threadably connect it thereat with the longitudinal bearer 7. The fastening bolts 18 extend through forwardly open slots 18' which are provided in a fixing lug 19 that extends transversely and is fixedly connected with the cylinder 5. In the rear area, the housing 12 is connected with the longitudinal bearer 7 by way of the fastening bolts 20 indicated in FIG. 1. These bolts 20 extend through forwardly open slots 21 in a lower base plate 22 of the housing 12.

OPERATION

The operation of the novel impact shock absorber arrangement is as follows, especially as regards the deformation member 6.

At an impact velocity up to about 8 km/h, the impact shock absorber 3 absorbs alone the entire impact energy. It can thereafter assume again its initial position.

At impact velocities above 8 km/h up to about 12 km/h, the entire impact energy is absorbed by the impact shock absorber 3 and the deformation member 6. The forward impact shock absorber anchoring by means of the fixing lug 19 thereby disengages from the fastening bolts 18 owing to the forwardly open slots 18'. At the same time, the roll sheet members 8, 9, 10 and 11 commence to deform. In order not to obtain any force peaks during the beginning of the deformation, the roll radius is already formed-on at the forward end of the roll sheet members. This radius remains essentially constant during the entire deformation operation because the still non-deformed section of each roll sheet member is supported at the housing inner wall and the already deformed section is supported at the cylinder 5 of the impact shock absorber 3. During the deformation of the roll sheet members 8, 9, 10 and 11, the cylinder 5 of the impact shock absorber 3 is guided within the forward section of the housing 12. In this manner, the deformation forces are readily controllable, and more particularly over the entire deformation range. An essentially rectangularly shaped force-displacement-diagram results as already mentioned. The deformation displacement is also comparatively large because the shock absorber end could be displaced rearwardly out of the housing 12 practically over the entire length of a roll sheet member. The entry of the impact shock absorber 3 and the deformation of the roll sheet members takes place as a rule at the same time.

After the occurrence of the load, the impact shock absorber 3 again travels into its starting position whereby the bumper 1 no longer reaches the original position because the rear end of the impact shock absorber 3 remains displaced. The longitudinal bearer 7 remains undamaged with the assumed impact velocities. Only the housing 12 equipped with the roll sheet members 8, 9, 10 and 11 has to be replaced in order to be able to establish again completely the original condition.

At impact velocities above approximately 12 km/h, a part of the impact energy is absorbed by the bumper arrangement according to the present invention. After the inward stroke of the impact shock absorber 3 with simultaneously roll off operation of the roll sheet members 8, 9, 10 and 11, the housing 12 is decoupled from the longitudinal bearer 7 in such a manner that now only the connection of the housing 12 with the longitudinal bearer 7 which is formed by the fastening bolts 18 remains in effect. Owing to the slots 21, the base plate 22 which is located at the rear end of the housing 12 can disengage from the fastening bolts 20. The housing 12 then no longer form a reinforcement significantly influencing the rigidity of the longitudinal bearer 7 so that the latter can deform freely and beginning from in front with a predetermined deformation behavior.

The longitudinal bearer 7 can thereby be so constructed that at impact velocities of about 15 to 20 km/h the longitudinal bearer is deformed only in its forward section which enables the already aforementioned cost-favorable sectional (cut-off) repair.

Also at still higher impact velocities, the impact shock absorber support according to the present invention provides a significant contribution to the decrease of the entire impact energy which contributes to an increase of the passenger protection. At such increased impact velocities, the impact shock absorbers 3, under some circumstances, can no longer retract sufficiently rapidly; they are therefore ineffective again by themselves. Roll sheet members then immediately become effective and dissipate impact energy. The entire deformation displacement at the vehicle is then somewhat reduced which, however, at such velocities again becomes effective favorably for the passenger protection.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A yielding arrangement of a bumper at a relatively fixed part of a motor vehicle, comprising impact shock absorber means extending approximately in the driving direction, each impact shock absorber means being operatively connected at one end with the bumper and being supported at another end against an energy dissipating deformation means arranged at the relatively fixed part of the vehicle, the deformation means including several separate roll sheet members which extend substantially parallel to the impact shock absorber means along inner walls of a housing means, which housing means is detachably secured at the relatively fixed vehicle part, and wherein each of said several separate roll sheet members has two ends, with one end being operatively connected opposite the bumper with said housing means whereas the other end is secured at the impact shock absorber means and to the other roll sheet members.

2. An arrangement according to claim 1, wherein the relatively fixed vehicle part is a longitudinal bearer.

3. An arrangement according to claim 1, wherein said roll sheet members are sheet metal members.

4. An arrangement according to claim 1, wherein two roll sheet members are formed each by legs of a U-shaped crimped member formed by a web which web is connected with the shock absorber means.

5. An arrangement according to claim 4, wherein two crimped members are provided whose webs cross one another at substantially right angle.

6. An arrangement according to claim 5, wherein one roll member is formed by a wall section of the housing means which is separated from the remaining walls by lateral longitudinal slots.

7. An arrangement according to claim 5, wherein the housing means is detachably connected with the relatively fixed vehicle part.

8. An arrangement according to claim 7, wherein the housing means accommodates the impact shock absorber means.

9. An arrangement according to claim 8, wherein the housing means is threadably connected with the relatively fixed vehicle part whereby bolt through-openings at the end of the housing means opposite the bumper are formed by slots open in the direction toward the bumper.

10. An arrangement according to claim 1, wherein the housing means is detachably connected with the relatively fixed vehicle part.

11. An arrangement according to claim 10, wherein the relatively fixed vehicle part is a longitudinal bearer.

12. An arrangement according to claim 10, wherein the housing means accommodates the impact shock absorber means.

13. An arrangement according to claim 10, wherein the housing means is threadably connected with the relatively fixed vehicle part whereby bolt through-openings at the end of the housing means opposite the bumper are formed by slots open in the direction toward the bumper.

14. An arrangement according to claim 13, wherein the housing means accommodates the impact shock absorber means.

15. An arrangement according to claim 1, wherein two crimped members are provided as said roll sheet members and wherein each crimped member has a web and wherein said webs cross one another at substantially a right angle.

16. An arrangement according to claim 1, wherein one roll member is formed by a wall section of the housing means which is separated from the remaining walls by lateral longitudinal slots.

* * * * *